US009845040B2

(12) United States Patent
Smith et al.

(10) Patent No.: US 9,845,040 B2
(45) Date of Patent: Dec. 19, 2017

(54) RAMP DEPLOYMENT SYSTEM

(71) Applicant: Universal Worldwide Ramp, LLC, Naples, FL (US)

(72) Inventors: Steve Smith, Alton, IL (US); Vern Van Hoy, Alson, IL (US); Vern Hurley, Hartford, IL (US)

(73) Assignee: Universal Worldwide Ramp, LLC, Naples, FL (US)

( * ) Notice: Subject to any disclaimer, the term of this patent is extended or adjusted under 35 U.S.C. 154(b) by 0 days.

(21) Appl. No.: 15/214,586

(22) Filed: Jul. 20, 2016

(65) Prior Publication Data
US 2016/0325666 A1    Nov. 10, 2016

Related U.S. Application Data (63) Continuation-in-part of application No. 14/274,101, filed on May 9, 2014, now abandoned.

(51) Int. Cl.
  *B65G 69/30* (2006.01)
  *B60P 1/43* (2006.01)
(52) U.S. Cl.
  CPC .............. *B60P 1/43* (2013.01); *B65G 69/30* (2013.01); *B65G 2207/40* (2013.01)
(58) Field of Classification Search
  CPC ................................. B65G 69/30; B60P 1/43
  USPC .................. 14/69.5, 71.1, 71.3; 414/528
  See application file for complete search history.

(56) References Cited

U.S. PATENT DOCUMENTS

| 1,158,829 | A | * | 11/1915 | Nicolaus | B60P 1/43 193/41 |
| 3,168,959 | A | * | 2/1965 | Chandler | B60P 1/43 220/23.4 |
| D291,619 | S | * | 8/1987 | Guillory | D34/32 |
| 4,761,847 | A | * | 8/1988 | Savage | B65G 69/30 108/167 |
| 4,779,298 | A | * | 10/1988 | Nichols, Sr. | B65G 69/30 14/69.5 |

(Continued)

FOREIGN PATENT DOCUMENTS

GB        2 451 154    *  1/2009

Primary Examiner — Gary Hartmann
(74) Attorney, Agent, or Firm — Polsinelli PC (57) ABSTRACT

A ramp deployment system for deploying and securing first and second ramps to the entrance of a container-type vehicle using a ratchet strap arrangement. The ratchet strap arrangement includes first and second ratchet strap devices each having a tightening strap coupled to a respective hook and collar mechanism that includes a closable hook operable to engage a collar to form a loop portion by the tightening strap around the undercarriage of the container-type vehicle. A ratchet mechanism is operatively coupled to the tightening strap for tightening or loosening the tightening strap relative to the first and second ramps when the ratchet strap mechanism is actuated. The ratchet mechanism is also engaged to a fixed length strap having a hook portion configured to engage the cross rungs of the first and second ramps and secure the ratchet strap arrangement securely between container-type vehicle and the first and second ramps. In some embodiments, a pair of connecting bars may be coupled between the first and second ramps to provide structural reinforcement between the first and second ramps.

17 Claims, 9 Drawing Sheets

(56) References Cited

U.S. PATENT DOCUMENTS

| | | | | |
|---|---|---|---|---|
| 5,768,733 A * | 6/1998 | Kneebone | ............... | B65G 69/30 14/69.5 |
| 6,099,233 A * | 8/2000 | Craik | ........................ | B60P 1/43 14/71.1 |
| 6,267,082 B1 * | 7/2001 | Naragon | ................. | A01K 29/00 119/849 |
| 7,237,294 B2 * | 7/2007 | Lensing | ................. | B65G 69/30 14/69.5 |
| 7,350,843 B2 * | 4/2008 | Meyers | ..................... | B60P 1/43 14/69.5 |
| 7,810,196 B1 * | 10/2010 | Pritchard | ............... | B65G 69/30 14/69.5 |
| 9,162,602 B2 * | 10/2015 | Wendinger | ............... | B60P 1/435 |
| 2015/0321861 A1 * | 11/2015 | Smith | .................... | B65G 69/30 14/71.1 |

* cited by examiner

RAMP DEPLOYMENT SYSTEM

CROSS REFERENCE TO RELATE APPLICATIONS

This is a continuation-in-part application that claims benefit to U.S. non-provisional application Ser. No. 14/274,101 filed on May 9, 2014, which is incorporated by reference in its entirety.

FIELD

The present disclosure relates to a ramp deployment system, and in particular to a mobile ramp deployment system that permits a secure attachment of mobile ramps to a trailer or other type of container vehicle.

BACKGROUND

Light-weight, mobile ramps are used to allow access to the inside of trailers, trucks or other types of container vehicles. For example, such mobile ramps can be used to permit utility vehicles, such as forklifts, to access the trailer and haul loaded pallets or bound material into or from the inside of the trailer. There are many different arrangements of mobile ramps that can be stored and then deployed from a trailer. A conventional ramp deployment system may include a mobile ramp arrangement having a pair of mobile ramps that support the respective left-side and right-side tires of a utility vehicle to establish a support pathway between the trailer and a lower surface for the utility vehicle to access the interior of the trailer. Typically, the mobile ramps are stored inside the trailer, and therefore must be manually deployed from the trailer by one or more individuals. The mobile ramps are temporary and therefore have the potential to move while in use. As such, the mobile ramps must be sufficiently secure and not move while a utility vehicle is moving on the mobile ramps. A ratchet and strap arrangement is known that is used to secure the mobile ramps to the trailer with each end of the ratchet and strap arrangement having an open hook in which one open hook is coupled to the cross rung of mobile ramp and the other open hook is coupled to the undercarriage of the trailer. A ratchet mechanism is operatively engaged to the strap and is operable to tighten the portion of the strap connected to the undercarriage in order to sufficiently secure the open hook thereto; however, there is a possibility that the open hook coupled to the undercarriage of the trailer may become disengaged or not fully secured to the undercarriage of the trailer prior to the strap being tightened. Because heavy utility vehicles and loaded pallets must repeatedly travel up and down the mobile ramps to the trailer, there is a need for a mobile ramp deployment system to securely stabilize and attach the mobile ramps to the trailer in a timely and efficient manner using a lone individual.

Corresponding reference characters indicate corresponding elements among the various views of the drawings. The headings used in the figures should not be interpreted to limit the scope of the claims.

DETAILED DESCRIPTION

Various embodiments for a ramp deployment system having a novel ratchet strap arrangement operable to secure a mobile ramp arrangement to a truck, trailer, or other type of container vehicle are disclosed. In some embodiments, the ramp deployment system includes a mobile ramp arrangement having a first ramp and a second ramp deployable from a trailer such that a utility vehicle can ride on the mobile ramp arrangement to access the trailer and haul loaded pallets or bound material into or from the inside of the trailer. In some embodiments, the first ramp is secured to a second ramp through one or more connecting bars that provides structural reinforcement between the first and second ramps. In some embodiments, the first and second ramps each include a traction arrangement defined along the underside of first ramp and second ramp in contact with a flat surface, such as a road or parking surface, to provide additional traction with the flat surface and prevent slippage of the mobile ramp arrangement during use.

Figure 1:
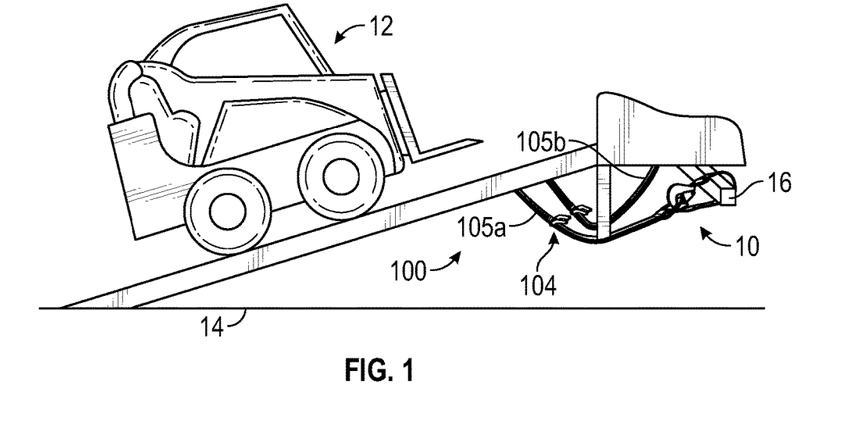
FIG. 1 is a side view of a ramp deployment system having a mobile ramp arrangement with first and second mobile ramps connected to a trailer using a ratchet strap arrangement having first and second ratchet strap devices.
Figure 2:
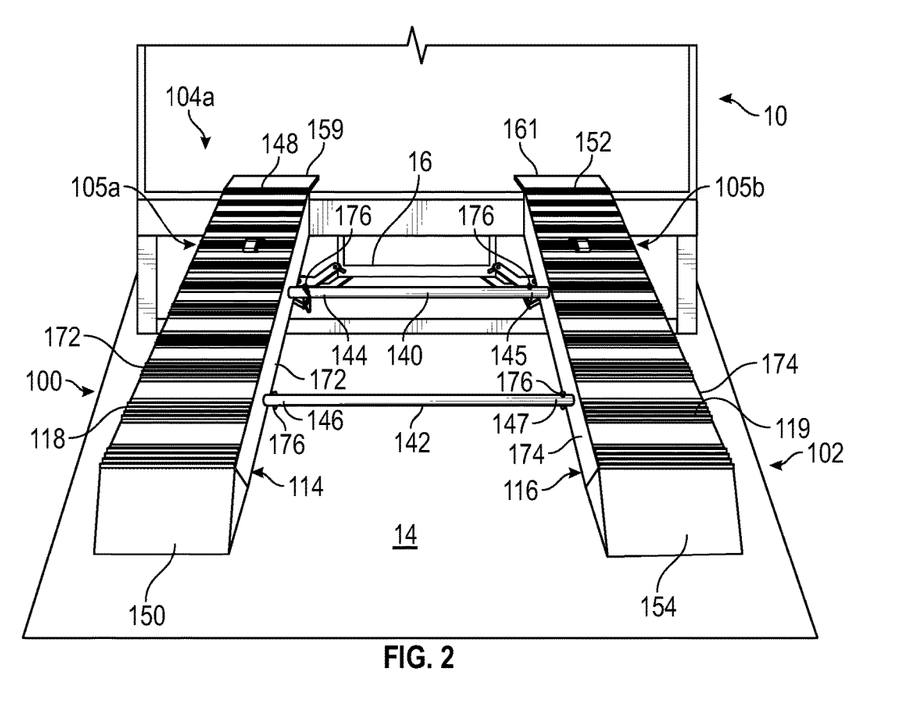
FIG. 2 is a front view of the ramp deployment system with first and second mobile ramps connected to a trailer and interconnected to each other through a pair of connecting bars.

Referring to the drawings, an embodiment of the ramp deployment system is illustrated and generally indicated as 100 in FIGS. 1-12. In general, as shown in FIGS. 1 and 2, the ramp deployment system 100 is operable to securely engage a deployed mobile ramp arrangement 102 to a trailer 10 or other type of container vehicle using a novel ratchet strap arrangement 104 to establish a secure coupling between the mobile ramp arrangement 102 and the trailer 10. In some embodiments, one end of the ratchet strap arrangement 104 may be coupled to the undercarriage 16 of the trailer 10 and an opposite end of the ratchet strap arrangement 104 may be coupled to the mobile ramp arrangement 102 for securely engaging the mobile ramp arrangement 102 to the trailer 10 as shall be described in greater detail below.

In many embodiments, the mobile ramp arrangement 102 includes a first ramp 112 and a second ramp 116 configured to be stored inside the trailer 10 and deployed from the trailer 10 in substantially parallel arrangement such that the utility vehicle 12 can safely ride upon the mobile ramp arrangement 102 when accessing the interior of the trailer 10. FIG. 2 shows the first and second ramps 114 and 116 in parallel orientation relative to each other and having one end in contact with the lip of the trailer 10 and spaced apart a predetermined distance such that the first ramp 114 supports one side of a utility vehicle 12 (FIG. 1) and the second ramp 116 supports the opposite side of the utility vehicle 12. In some embodiments, the first ramp 114 and second ramp 116 may be manufactured from a lightweight metallic material sufficiently strong enough to support the weight of a small utility vehicle 12, yet light enough to be portable and allow an individual to handle the mobile ramp arrangement 102 during deployment, assembly and disassembly without assistance. In some embodiments, the utility vehicle 12 may be a forklift, or other type of utility vehicle, although other types of vehicles, such as an all-terrain vehicle, capable of being stored in the trailer of a container-type vehicle or truck are also contemplated.

Figure 5:
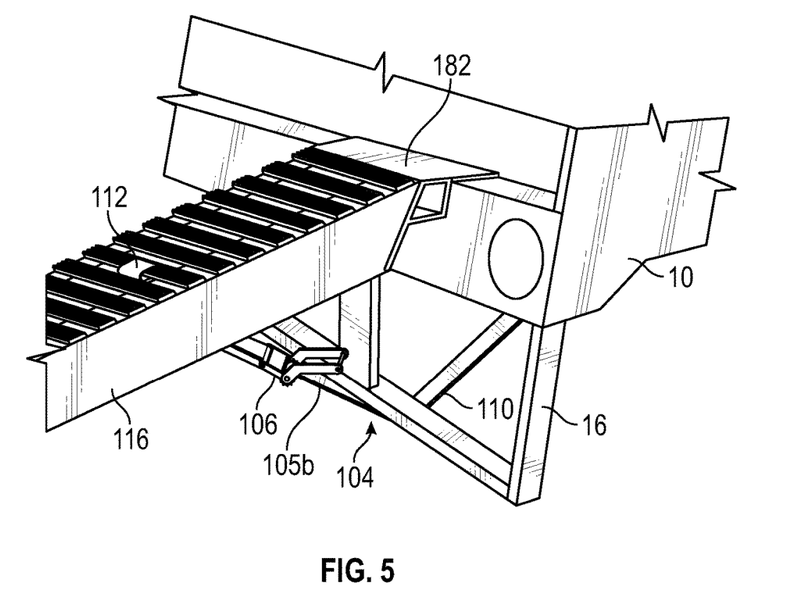
FIG. 5 is perspective view of the ratchet strap device having a hook strap portion connected to the mobile ramp arrangement.

Referring back to FIG. 2, in some embodiments the first ramp 114 may define a first ramp end 148 configured to abut the lip of the trailer 10 and a second ramp end 150 configured to contact a substantially flat surface 14, such as a road or parking surface. Similarly, the second ramp 116 may define a first ramp end 152 configured to abut the lip of the trailer 10 and a second ramp end 154 configured to contact the substantially flat surface 14. In some embodiments, the first ramp end 148 of the first ramp 114 may define a flange 159 configured to abut the lip of the entrance to the trailer 10 as shown in FIG. 5. Similarly, the first ramp end 152 of the second ramp 116 may define a flange 161 configured to also abut the floor of the lip of entrance to the trailer 10 as shown in FIG. 5. Alternatively, the flanges 159 and 161 of the first and second ramps 114 and 116, respectively, may be configured to attach to round rails or rub rails (not shown) of the trailer 10 to secure the respective first ramp ends 148 and 152 to the lip of the trailer 10.

In many embodiments the first ramp 114 may include a plurality of cross rungs 118 arranged in parallel orientation relative to each other and defined between opposite side portions 172 of the first ramp 114 to establish a riding surface that provides sufficient traction for one side of the utility vehicle 12 to ride upon and provide structural integrity to the first ramp 114. Similarly, the second ramp 116 may also include a plurality of cross rungs 119 arranged in parallel orientation relative to each other and defined between opposite side portions 174 of the second ramp 116. In some embodiments, the cross rungs 118 and 119 may be serrated to provide additional traction to the utility vehicle 12.

Figure 3:
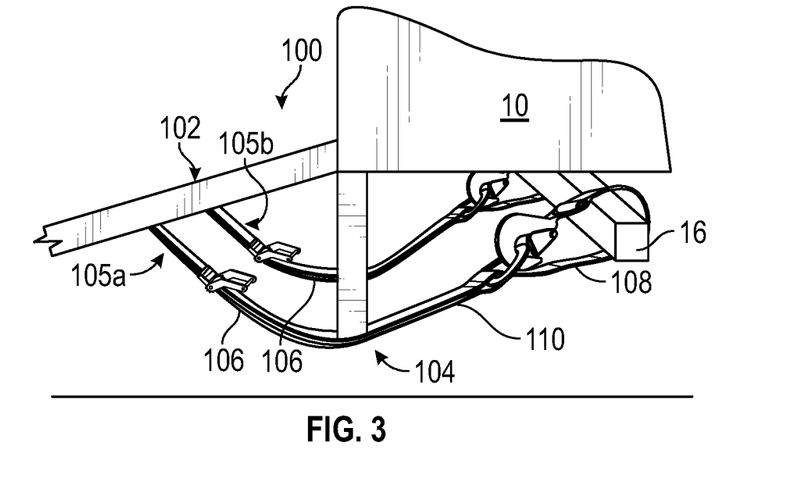
FIG. 3 is a side view of the ramp deployment system with the first and second ratchet strap devices connected between the trailer and the mobile ramp arrangement.
Figure 6A:
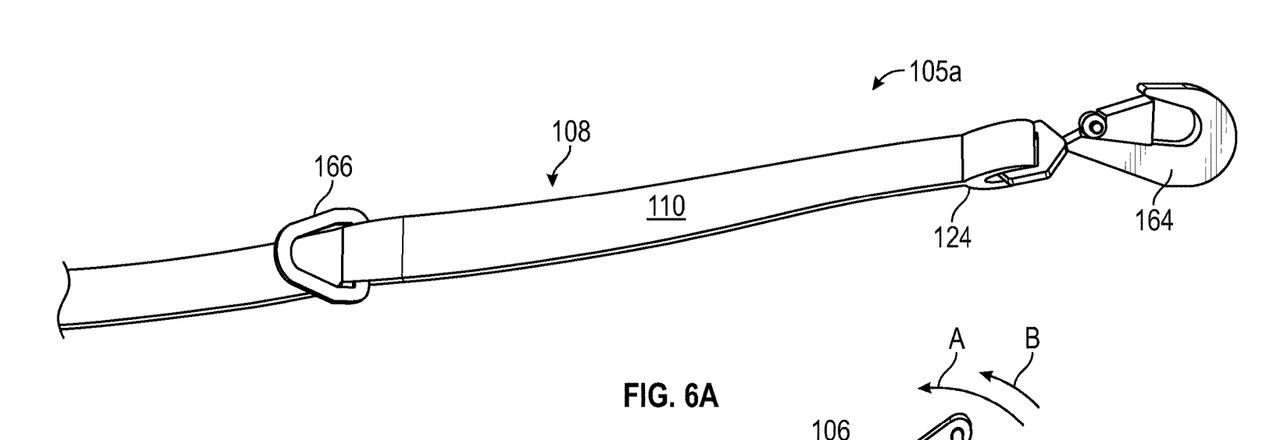
FIG. 6A is a perspective view illustrating the one end of the ratchet strap device with the hook and strap mechanism used to couple the tightening strap to the undercarriage of a trailer and FIG. 6B is a perspective view illustrating an opposite end of the ratchet strap device with the hook strap portion connected to a ratchet mechanism through a fixed length strap.

As further shown, ratchet strap arrangement 104 includes a pair ratchet strap devices 105A and 105B operable for tightening and loosening a respective elongated tightening strap 110 coupled between the underside of the trailer 10 and the first and second ramps 114 and 116, respectively. For example, in some embodiments the underside of the trailer 10 may be an undercarriage 16 defining a cross bar arrangement of one or more cross bars configured to be coupled to engage each ratchet strap device 105A and 105B as shown in FIG. 3. By way of example, only the ratchet strap device 105A will be described since both ratchet strap devices 105A and 105B are identical in structure and operation. The ratchet strap device 105A includes an elongated tightening strap 110 having a first end portion 124 (FIG. 6A) and a second end portion 126 (FIG. 6B) defined at the opposite ends of the elongated tightening strap 110. In many embodiments, the first end portion 124 of the elongated tightening strap 110 is coupled to a hook and collar mechanism 108 for coupling the elongated tightening strap 110 around the undercarriage 16 of the trailer 10 in a loop configuration. As shown in FIG. 6A, the hook and collar mechanism 108 includes a closable hook 164 secured to the first end portion 126 and a collar 166 secured to another part of the elongated tightening strap 166. In assembly, the closable hook 164, may be directed along direction f to engage the closable hook 164 with the collar 166 to form a loop strap portion 168 around the undercarriage 16. In this arrangement, the coupling of the closable hook 164 with the collar 166 provides a quick and secure means of attaching the ratchet strap device 105A to the undercarriage 16 of the trailer 10.

Figure 6B:
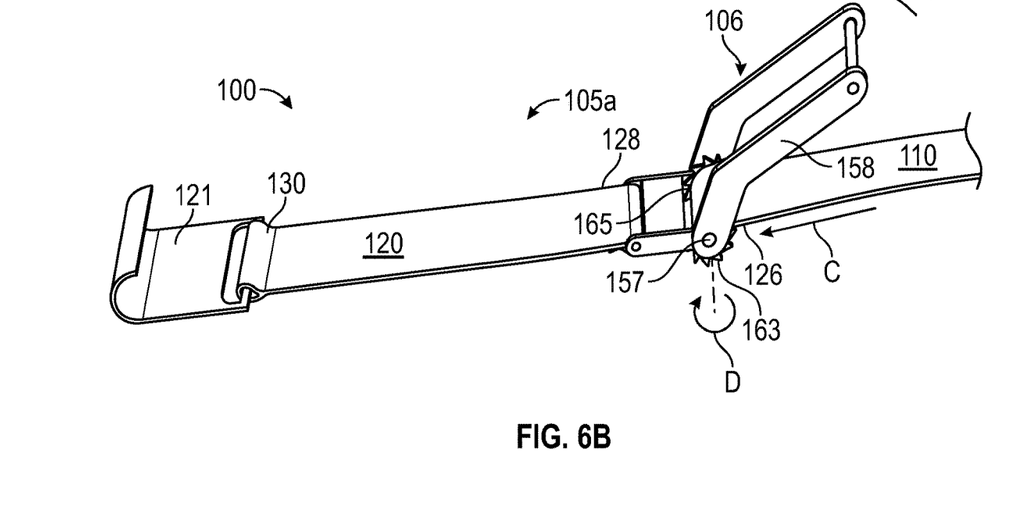

As shown in FIG. 6B, the second end portion 126 of the elongated tightening strap 110 is operatively coupled to a ratchet mechanism 106 that is operable to either tighten or loosen the elongated tightening strap 110. In some embodiments, the ratchet mechanism 106 may be a conventional ratchet mechanism for tightening and loosening the elongated tightening strap 110. For example, the ratchet mechanism 106 may be a ROADPRO® ratchet mechanism manufactured by DDS Companies, Inc., although other types of ratchet mechanisms that are operable for tightening and loosening the elongated tightening strap 110 are also contemplated. In assembly, the ratchet mechanism 106 is engaged to the first end portion 126 of the elongated tightening strap 110 in order to tighten or loosen the elongated tightening strap 110 when the hook and collar mechanism is engaged to the trailer 10, while the opposite end of the ratchet mechanism 106 is engaged to a fixed length strap 120 having a first end 128 engaged to the ratchet mechanism 106 and a second end 130 secured to an open hook 121 configured to engage the fixed length strap 120 to a respective cross-rung 118 or 119 of the first and second ramps 114 and 116, respectively. When the ratchet strap device 105A is coupled between the first ramp 114 and the undercarriage 16 of the trailer 10 and actuated to tighten to the tightening strap 110, the fixed length strap 120 is maintained in fixed length engagement between the ratchet mechanism 106 and the first ramp 114, while the length of the elongated tightening strap 110 may be varied (e.g., tightened) by operation of the ratchet mechanism 106 which causes the length of the tightening strap 140 to shorten and establish a secure, tight engagement between the first ramp 114 and the trailer 10 by the ratchet strap device 105A.

In some embodiments, the ratchet mechanism 106 includes a ratchet handle 158 pivotally engaged to an axle 157 that is coupled to a pair of opposing circular plates 163 and 165 that each define a plurality of teeth that allow the ratchet mechanism 106 to engage the second end portion 126 of the elongated tightening strap 110 and incrementally rotate the tightening strap 110 around the axle 157 in a counterclockwise direction D as the handle 158 is pivoted between a proximal direction A and a distal direction B. In addition, as the handle 158 is pivoted in a back-and-forth motion the elongated tightening strap 110 is moved in direction C and tightened as the second end portion 126 of the elongated tightening strap 158 is incrementally wrapped around the axle 157 as shown in FIG. 6B.

Figure 4:
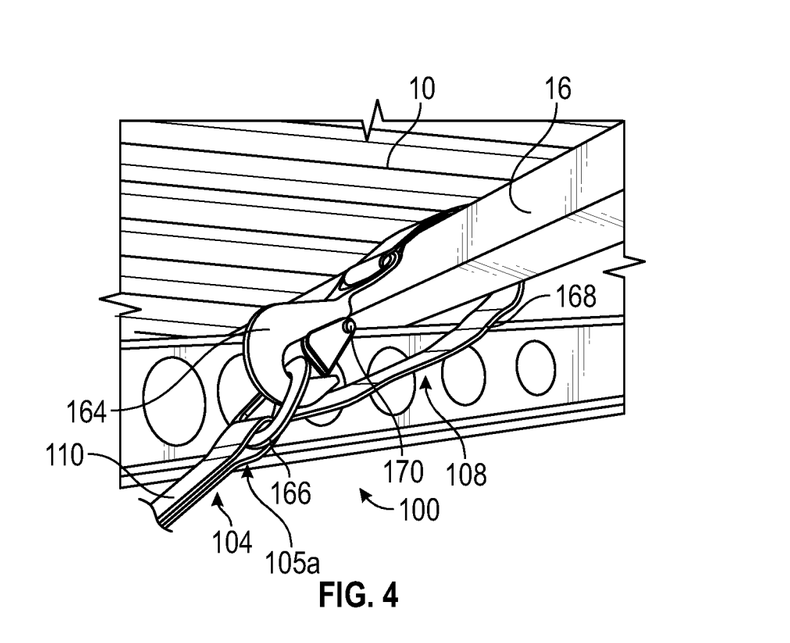
FIG. 4 is an enlarged perspective view of a hook and collar mechanism of the ratchet strap device attached to the undercarriage of the trailer.
Figure 7A:
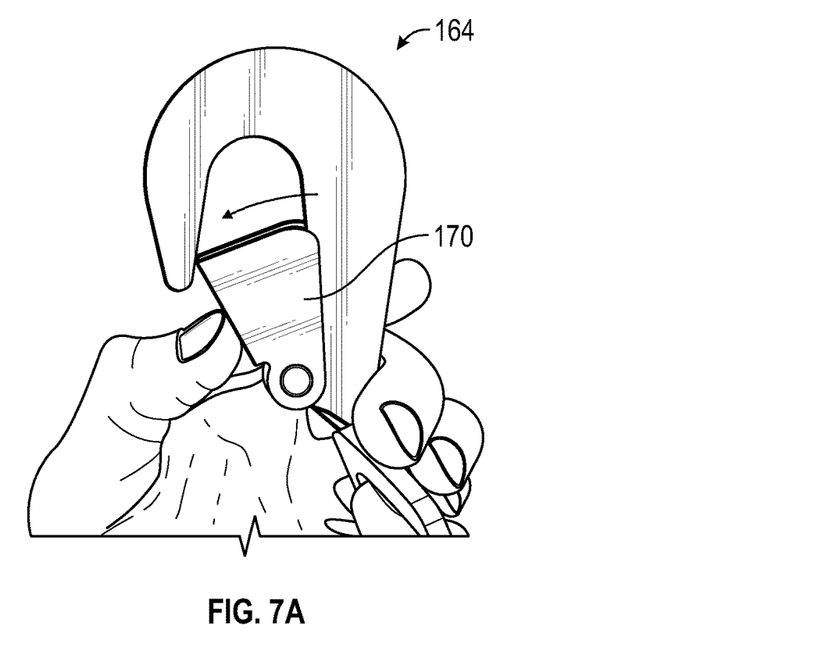
FIG. 7A is an enlarged view of the hook and strap mechanism with the closable hook in an open position and FIG. 7B is an enlarged view of the hook and strap mechanism with the closable hook in a normally-closed position.
Figure 7B:
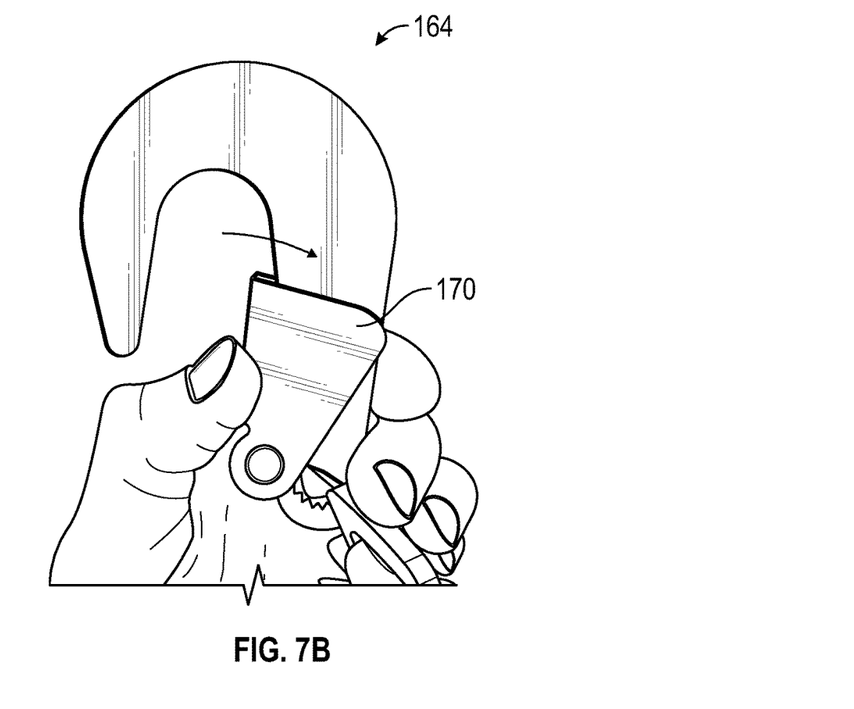

Referring to FIG. 4, as noted above, the first end portion 124 of the elongated tightening strap 110 may be connected to undercarriage 16 of the trailer 10 using a hook and collar mechanism 108 of the ratchet strap device 105A to form the loop strap portion 168 around the undercarriage 16 prior to tightening the elongated tightening strap 110 using the ratchet mechanism 106. To couple the elongated tightening strap 110 to the undercarriage 16 of the trailer 10, an individual loops the first end portion 124 with the closable hook 164 around the undercarriage 16 and engages the collar 166 to form the loop strap portion 168 that is looped around the undercarriage 16. The individual accomplishes this engagement by actuating the closable hook 164 from the normally-closed position (FIG. 7B) to an open position (FIG. 7A). Once the closable hook 164 is in the open position and swung around the undercarriage 16 the collar 166 is captured within the closable hook 164 and retained therein when the closable hook 164 is placed back in the normally-closed position (FIG. 7B). In this arrangement, the loop strap portion 168 formed by the hook and collar mechanism 108 around the undercarriage 16 establishes a quick and secure engagement with the trailer 10, while the open hook 121 of the fixed length strap 120 of the ratchet strap device 105A establishes a secure engagement with the first ramp 114.

This method of securing the ratchet strap device 105A between the undercarriage 16 and first ramp 114 is repeated for securing the other ratchet strap device 105B between another portion of the undercarriage 16 and the second ramp 116 such that the first and second ramps 114 and 116 are both secured to the trailer 10 in an easy, quick and efficient manner by a single individual. As such, the ramp deployment system 100 allows a lone individual to deploy and secure the mobile ramp arrangement 102 using the ratchet strap arrangement 104 without outside assistance.

In some embodiments, the elongated tightening strap 110 and the fixed length strap 120 may be made of industrial grade webbing, including but not limited to nylon webbing. The width of both the elongated tightening strap 110 and the fixed length strap 120 may be the same width and may range from about 1 inch to about 4 inches. The open hook 120 of the hook strap portion 112 may be made from a plastic material, a metal material, or any other suitable material with sufficient strength to attach and retain the fixed length strap 120 to an object, such as the cross-rungs 118 and 119 of the first and second ramps 114 and 116. Non-limiting example of hooks 120 may include flat hooks, J-hooks, and S-hooks.

Figure 8:
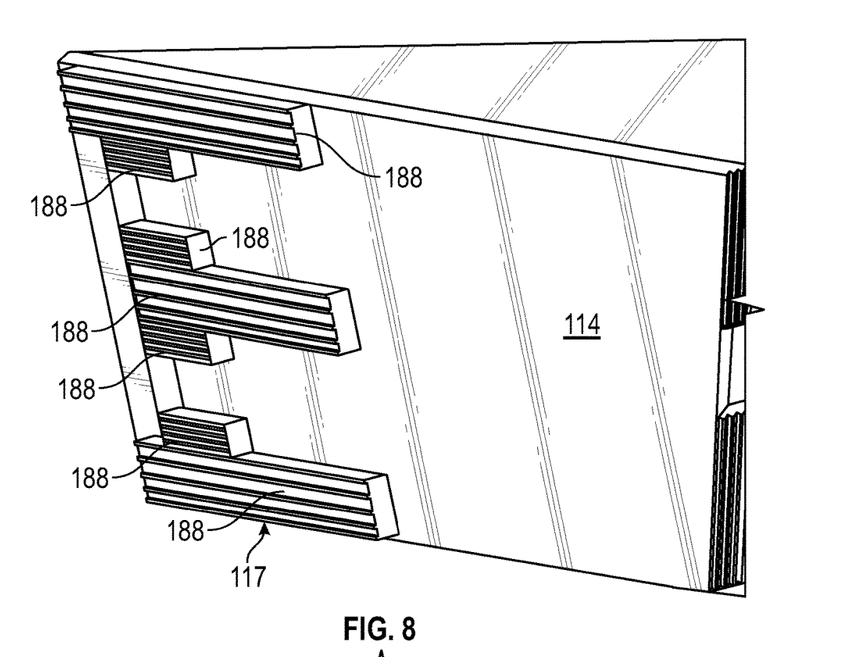
FIG. 8 is an enlarged view of an underside of the first ramp showing a plurality of raised traction portions of the traction arrangement.
Figure 9:
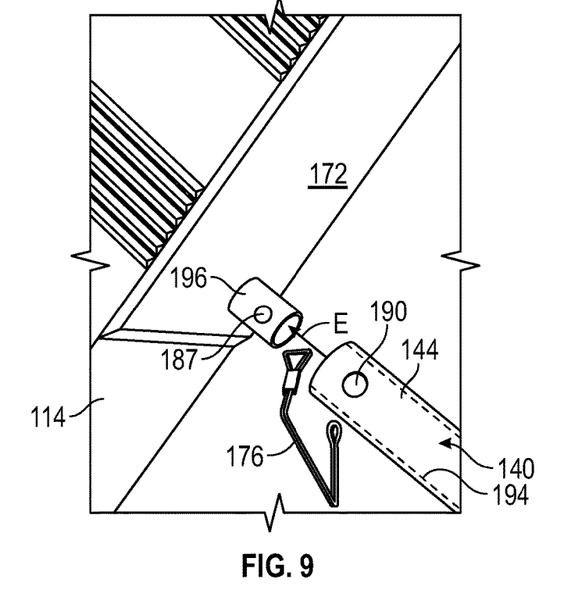
FIG. 9 is an enlarged view of one end of the first connecting bar shown in FIG. 2.

Referring back to FIG. 1, the mobile ramp arrangement 102 is secured to the trailer 10 by the ratchet strap arrangement 104 in a manner sufficient to bear the weight of a small utility vehicle 118 for transporting a load or bundle into and from the trailer 10 without the first and second ramps 114 and 116 becoming disengaged from the lip of the trailer 10 or change position relative to the lower flat surface 14. As shown in FIG. 8, in some embodiments, the underside of the first ramp 114 and second ramp 116 may include a traction arrangement 117 for providing additional traction to the second ramp ends 150 and 154 that contact the lower flat surface 14 when the first and second ramps 114 and 116 are deployed. For example, the traction arrangement 117 may define a plurality of raised traction portions 188 as shown in FIG. 9. In some embodiments the traction arrangement 117 may define a plurality of serrations to provide additional traction to the underside of the first and second ramps 114 and 116.

Figure 11:
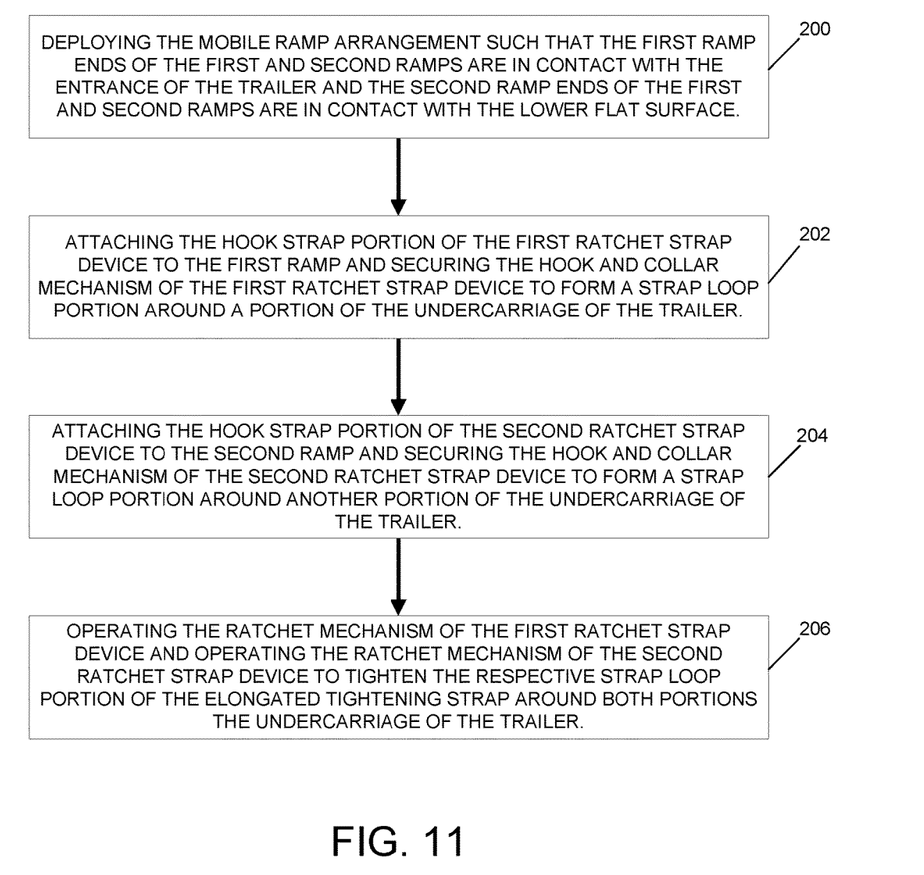
FIG. 11 is a flow chart illustrating one method for securing the mobile ramp arrangement to a trailer using the ratchet strap arrangement.

Referring to FIG. 11, a flow chart illustrates one method for deploying the ramp deployment system 100. At step 200, deploying the mobile ramp arrangement 102 such that the first ramp ends 148 and 152 of the first and second ramps 114 and 116, respectively, are in contact with the entrance of the trailer 10 or container-type vehicle and the second ramp ends 150 and 154 of the first and second ramps 114 and 116, respectively, are in contact with the lower flat surface 14 below the trailer 10. At block 202, attaching the open hook 121 of the hook strap portion 112 for the first ratchet strap device 105A to the first ramp 114 and looping around the closable hook 164 hook and collar mechanism 108 of the ratchet strap device 105B around a portion of the undercarriage 16 of the trailer 10 to form a loop strap portion 168 when the collar 166 is coupled to the closable hook 164. At block 204, attaching the open hook 121 of the hook strap portion 112 for second ratchet strap device 105B to the second ramp 116 and looping closable hook of the hook and collar mechanism 108 of the second ratchet strap device 105B around another portion of the undercarriage 16 of the trailer 10 to form a loop strap portion 168 when the closable hook 164 us coupled to the collar 166. At block 206, operating the ratchet mechanism 106 of the first ratchet strap device 105A and then operating the ratchet mechanism 106 of the second ratchet strap device 105B to tighten the respective loop strap portion 168 of the elongated tightening strap 110 relative to the undercarriage 16 of the trailer 10 and the mobile ramp arrangement 102.

Figure 10:
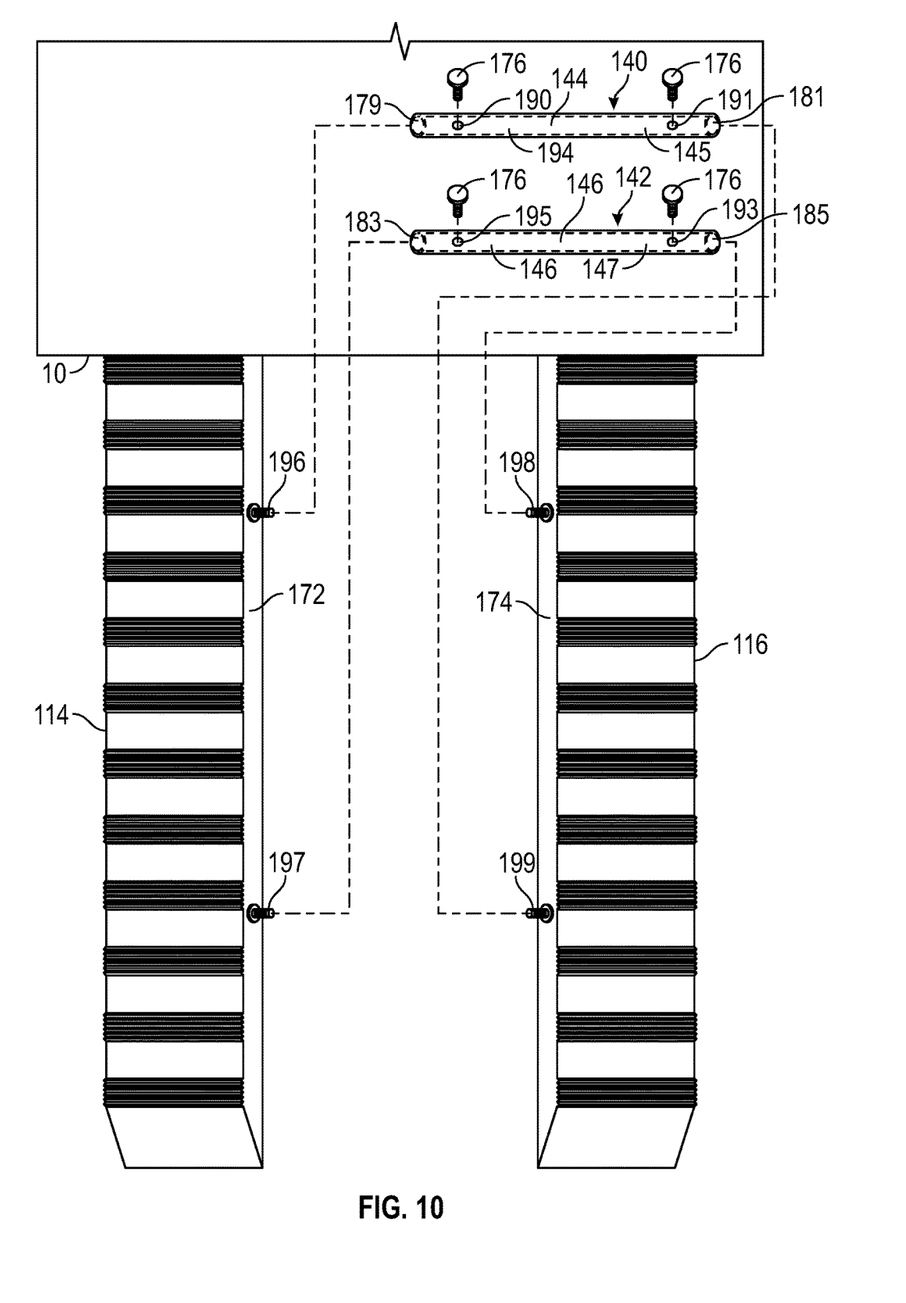
FIG. 10 is an exploded view of the connecting bars that interconnect the first and second ramps of the mobile ramp arrangement.

In another aspect, the ramp deployment system 100 may include a first connecting bar 140 and a second connecting bar 142 that interconnect the first ramp 114 with the second ramp 116 to provide further structural reinforcement and stability for the mobile ramp arrangement 102 when the ramp deployment system 100 is deployed as illustrated in FIGS. 2 and 10. In many embodiments, the first connecting bar 140 may be identical or similar to the second connecting bar 142 and may have the same length equal to a distance 400 defined between the first and second ramps 114 and 116 when deployed and engaged to the trailer 10 in parallel orientation. In one aspect, the first and second connecting bars 140 and 142 may be assembled and disassembled in a quick and efficient manner when deploying the ramp deployment system 100 as described in greater detail below.

As shown in FIGS. 2, 9 and 10, in many embodiments the first connecting bar 140 defines a first channel 194 in communication with a first axial opening 179 at a first end portion 144 and a second axial opening 181 at a second end portion 145 of the first connecting bar 140. As shown in FIG. 10, the second connecting bar 142 defines a second channel 195 in communication with a first axial opening 183 at a first end portion 146 and a second axial opening 185 at an opposite second end portion 147 of the second connecting bar 142. The first and second axial openings 179 and 181 of the first connecting bar 140 are configured to engage respective first and second mounting portions 196 and 197 defined along the opposite side portions 172 and 174 of the first and second ramps 114 and 116 to allow the first connecting bar 140 to be securely mounted between the first and second ramps 114 and 116 when deployed. Similarly, the first and second axial openings 183 and 185 of the second connecting bar 142 are configured to engage respective third and fourth mounting portions 198 and 199 defined along the opposite side portions 172 and 174 of the first and second ramps 114 and 116 to also allow the second connecting bar 142 to be securely mounted between the first and second ramps 114 and 116.

As shown in FIG. 10, the first end portion 144 of the first connecting bar 140 further defines a first radial aperture 190 in perpendicular relation to the first axial opening 179 and the second end portion 145 that defines a second radial aperture 191 in perpendicular relation to the second axial opening 181. Both the first and second radial apertures 190 and 191 communicate with the first axial channel 194 (shown in phantom). Similarly, the first end portion 146 of the second connecting bar 142 further defines a third radial aperture 192 in perpendicular relation to the first axial opening 183 and a second end portion 147 that defines a fourth radial aperture 193 in perpendicular relation to the second axial opening 185. Both the third and fourth radial apertures 192 and 193 communicate with the second axial channel 195 (shown in phantom).

As shown in FIGS. 9 and 10, each mounting portion 196, 197, 198 and 199 defines a radial opening 187 that is aligned with respective radial openings 190, 191 of the first connecting bar 140 and respective radial openings 192 and 193 of the second connecting bar 142 when securing the first and second connecting bars 140 and 142 between the first and second ramps 114 and 116. In this manner, the first and second connecting bars 140 and 142 may be aligned with respective pair of opposite mounting portions 196, 198 and 197, 199 such that a respective securing member 176, for example a cotter pin or rod, may be inserted through radial openings 187 aligned with respective radial openings 190, 191, 192 and 193 to secure the first and second connecting bars 140 and 142 between the first and second ramps 114 and 116.

Figure 12:
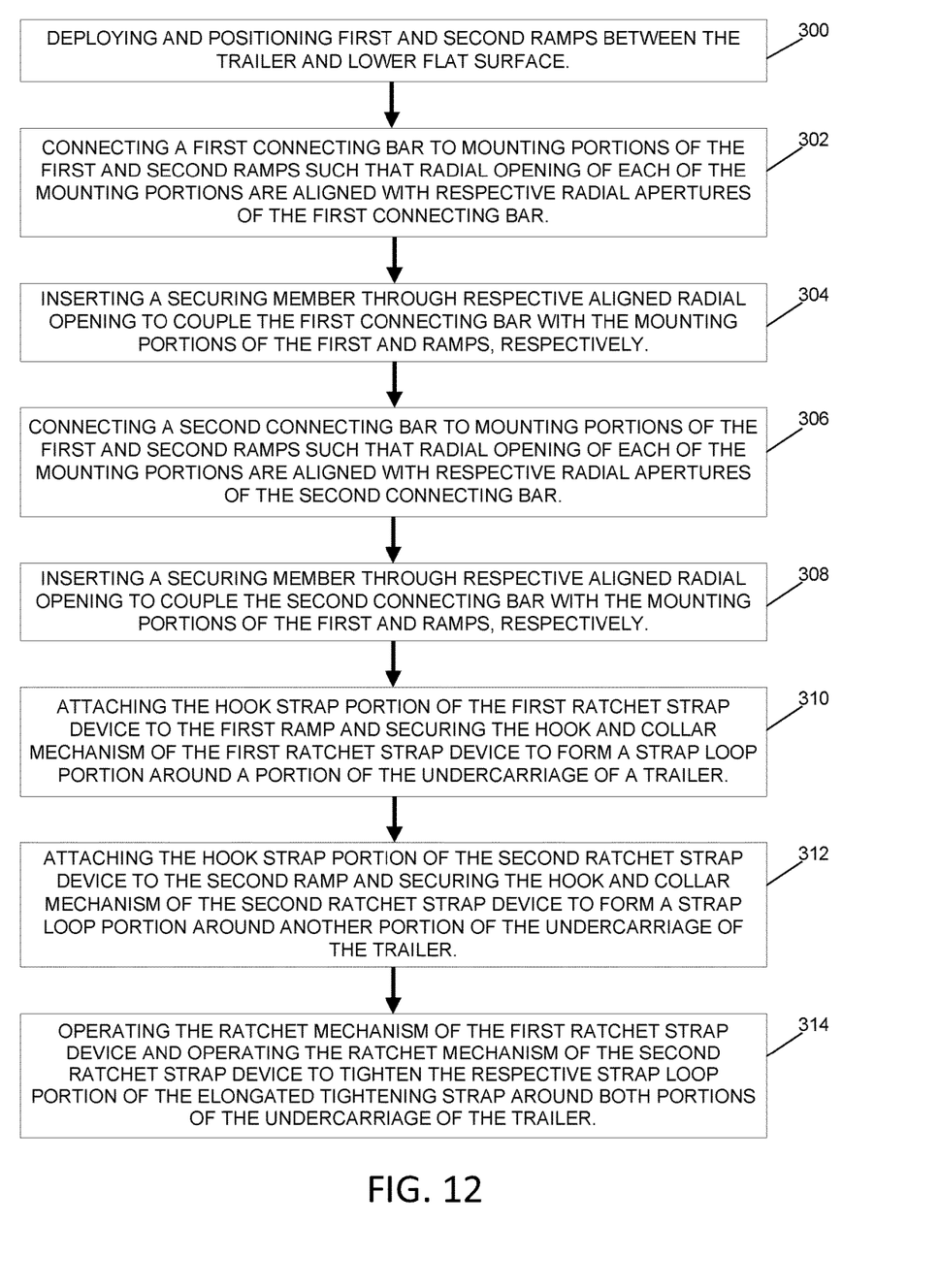
FIG. 12 is a flow chart illustrating another method for securing the mobile ramp arrangement to a trailer using the ratchet strap arrangement and first and second connecting bars between the first and second ramps.

Referring to FIG. 12, a flow chart illustrates one method for deploying the ramp deployment system 100 using the first and second connecting bars 140 and 142 to interconnect the first and second ramps 114 and 116. At block 300, deploying first and second ramps 114 and 116 between the trailer 10 and lower flat surface 14. At block 302, connecting a first connecting bar 140 to mounting portions 196 and 198 of the first and second ramps 114 and 116 such that radial opening 187 of each of the mounting portions 196 and 198 is aligned with respective radial apertures 190 and 191 of the first connecting bar 140. At block 304, inserting a securing member 176 through respective aligned radial opening 187 to couple the first connecting bar 140 with the respective mounting portions 196 and 198 of the first and ramps 114 and 116, respectively. In some embodiments, at block 306, connecting a second connecting bar 142 to respective mounting portions 197 and 199 of the first and second ramps 114 and 116 such that each radial opening 187 of the mounting portions 197 and 199 is aligned with respective radial apertures 192 and 193 of the second connecting bar 142. At block 308, inserting a securing member 176 through respective aligned radial opening 187 to couple the second connecting bar 142 with the mounting portions 197 and 199 of the first and ramps 114 and 116, respectively. At block 310, attaching the open hook 121 of hook strap portion 112 for the first ratchet strap device 105A to the first ramp 114 and looping around the closable hook 164 of the hook and collar mechanism 108 of the first ratchet strap device 105A around a portion of the undercarriage 16 of the trailer 10 to form a loop strap portion 168. At block 312, attaching open hook 121 of the hook strap portion 112 for the second ratchet strap device 105B to the second ramp 116 and looping around the closable hook 166 of the hook and collar mechanism 108 for the second ratchet strap device 105B around another portion of the undercarriage 16 to form a loop strap portion 168 such that the closable hook 166 is engaged to the collar. At block 314, operating the ratchet mechanism 106 of the first ratchet strap device 105A and the ratchet mechanism 106 of the ratchet strap device 105B to tighten the respective loop strap portion 168 of the elongated tightening strap 110 relative to the undercarriage 16 of the trailer 10.

As noted above, the ramp deployment system 100 may be used to store and transport bundled items, such as disassembled cardboard boxes, from various sites using the utility vehicle 12 initially stored in the trailer 10 to transport each bundle into the trailer 10. In this particular application of the ramp deployment system 100, the user will deploy the mobile ramp arrangement 102 from the trailer 10 using the ratchet strap devices 105A and 105B to secure the first and second ramps 114 and 116, respectively, between the mobile ramp arrangement 102 and the trailer 10 in order to allow the utility vehicle 104 to transport each bundle into the trailer 10. Once the bundles are transported inside the trailer 10, the utility vehicle 12 is stored in front of the stored bundles and the mobile ramp arrangement 102 may be disengaged from the ratchet strap devices 105A and 105B so that both the first and second ramps 114 and 116 and the ratchet devices 105A and 105B may be stored in the trailer 10. Although the ramp deployment system 100 may be used to store and transport bundled items using the utility vehicle 12 as described above, other types of applications for the ramp deployment system 100 are contemplated, such as transportation and storage of a unbundled items that are shrink wrapped onto a pallet or other types of articles that require pick up and transportation.

It should be understood from the foregoing that, while particular embodiments have been illustrated and described, various modifications can be made without departing from the spirit and scope of the invention as will be apparent to those skilled in the art. Such changes and modifications are within the scope and teachings of this invention as defined in the claims appended hereto.

What is claimed is:

1. A ramp deployment system comprising:
a mobile ramp arrangement comprising:
a first ramp and a second ramp, the first ramp and second ramp defining a respective first end and a respective second end;
a ratchet strap arrangement operatively secured between the mobile ramp arrangement and a container-type vehicle, the ratchet strap arrangement comprising a first ratchet strap device and a second ratchet strap device, wherein the first ratchet strap device is secured between the first ramp and the container-type vehicle, and wherein the second ratchet strap device is secured between the second ramp and the container-type vehicle, each of the first and second ratchet strap devices comprising:
a ratchet mechanism coupled between a fixed length strap and a tightening strap, wherein the fixed length strap defines a distal end and a proximal end and the tightening strap defines a distal end and a proximal end,
wherein the distal end of the fixed length strap is coupled to an open hook of a hook strap portion configured to engage the first or second ramp, and the proximal end of the fixed length strap is coupled to the ratchet mechanism, and
wherein the distal end of the tightening strap is coupled to a hook and collar mechanism comprising a closable hook coupled to one portion of the tightening strap and a collar coupled to another portion of the tightening strap, wherein the closable hook is operable to engage the collar to form a loop strap portion by the tightening strap.

2. The ramp deployment system of claim 1, wherein the loop strap portion formed by the distal end of the tightening strap is configured to engage an undercarriage of the container-type vehicle and the proximal end of the tightening strap is coupled to the ratchet mechanism such that actuation of the ratchet mechanism incrementally tightens the loop strap portion formed by the tightening strap relative to the undercarriage of the container-type vehicle.

3. The ramp deployment system of claim 1, wherein each of the first and second ramps defines a plurality of cross rungs, and wherein the open hook of the hook strap portion of each respective fixed length strap is configured to engage a respective cross rung on the first and second ramps.

4. The ramp deployment system of claim 1, wherein the respective second end of the first and second ramps are configured to contact a lower surface below the container-type vehicle, wherein each second end of the first and second ramps includes a traction arrangement configured to prevent slippage of the first and second ramps relative to the lower surface.

5. The ramp deployment system of claim 4, wherein the traction arrangement comprises a plurality of raised traction portions that extend from the underside of the first and second ramps.

6. The ramp deployment system of claim 4, wherein the traction arrangement comprises a plurality of serrations defined along the underside of the second end of the first and second ramps.

7. The ramp deployment system of claim 1, wherein opposite side portions of the first and second ramps define at least one pair of mounting portions configured to engage a respective end of a connecting bar.

8. The ramp deployment system of claim 7, wherein the connecting bar comprises an axial channel in communication with opposite axial openings configured to engage the at least one pair of mounting portions of the first and second ramps.

9. The ramp deployment system of claim 7, wherein the connecting bar further comprises first and second radial apertures and the at least one pair of mounting portions comprises first and second radial openings, wherein the first and second radial openings are aligned with the first and second radial apertures when the connecting bar is mounted to the at least one pair of mounting portions.

10. The ramp deployment system of claim 1, wherein each ratchet mechanism further comprises:
a handle pivotally connected to an axle, the axle being configured to engage proximal end of the tightening strap such that actuation of the handle in a back-and-forth motion tightens the tightening strap that forms the loop portion.

11. The ramp deployment system of claim 1, wherein the collar is secured to a portion of the tightening strap closest to the ratchet mechanism.

12. The ramp deployment system of claim 1, wherein the closable hook is secured to a free end of the tightening strap.

13. The ramp deployment system of claim 1, wherein the closable hook is operable between a normally-closed position wherein the collar is retained within the closable hook to form the loop strap portion by the tightening strap, and an open position wherein the collar is released from the closable hook.

14. The ramp deployment system of claim 1, wherein the container-type vehicle comprises a truck, a trailer, and a hauling vehicle.

15. A method of deploying a ramp deployment system comprising:
deploying a mobile ramp arrangement from a container-type vehicle, the mobile ramp arrangement comprising a first ramp and a second ramp, each of the first ramp and second ramp defining a respective first end and a respective second end;
securing a ratchet strap arrangement between respective first and second ramps and the trailer, the ratchet strap arrangement comprising a first ratchet strap device and a second ratchet strap device, wherein the first ratchet strap device is secured between the first ramp and a trailer, and wherein the second ratchet strap device is secured between the second ramp and the trailer, each of the first and second ratchet strap devices comprising: and
engaging a ratchet strap device between a respective first and second ramp and the container-type vehicle, each of ratchet strap devices comprising:
a ratchet mechanism coupled between a fixed length strap and a tightening strap, wherein the fixed length strap defines a distal end and a proximal end and the tightening strap defines a distal end and a proximal end,
wherein the distal end of the fixed length strap is coupled to an open hook of a hook strap portion and the proximal end of the fixed length strap is coupled to the ratchet mechanism, and
wherein the distal end of the tightening strap is coupled to a hook and collar mechanism comprising a closable hook coupled to one portion of the tightening strap and a collar coupled to another portion of the tightening strap, wherein the closable hook is operable to engage the collar to form a loop strap portion by the tightening strap;
attaching the open hook of the hook strap portion of the fixed length strap for the first and second ratchet strap devices to respective first or second ramps;
looping the closable hook of each hook and collar mechanism around an undercarriage of the container-type vehicle; and
coupling the closable hook with the collar to form the loop strap portion with the tightening strap around the undercarriage.

16. The method of claim 15, further comprising:
operating the ratchet mechanism to shorten the relative length of the tightening strap.

17. The method of claim 15, further comprising:
mounting at least one connecting bar between the first and second ramps.

* * * * *